A. T. RASMUSSEN.
MOLDING APPLIANCE.
APPLICATION FILED FEB. 1, 1908.

901,471.

Patented Oct. 20, 1908.

INVENTOR:
A. T. Rasmussen
By
W. J. Fitzgerald & Co.
attorneys.

Witnesses.

UNITED STATES PATENT OFFICE.

ALFRED T. RASMUSSEN, OF LA CROSSE, WISCONSIN.

MOLDING APPLIANCE.

No. 901,471.　　　　Specification of Letters Patent.　　　Patented Oct. 20, 1908.

Application filed February 1, 1908. Serial No. 413,857.

*To all whom it may concern:*

Be it known that I, ALFRED T. RASMUSSEN, a citizen of the United States, residing at La Crosse, in the county of La Crosse and State of Wisconsin, have invented certain new and useful Improvements in Molding Appliances; and I do hereby declare the following to be a full, clear, and exact description of the invention, such as will enable others skilled in the art to which it appertains to make and use the same.

My invention relates to new and useful improvements in molding appliances and my object is to provide means for directing air or steam into contact with the molten substance, whereby said substance will be directed into all parts of the mold.

A further object is to provide means for directing the air conveying parts into engagement with the mold.

A still further object is to provide means for increasing or decreasing the pressure on the air conveying parts to hold the same in engagement with the mold and a still further object is to provide means for stopping the flow of air or steam through the conveying parts.

Other objects and advantages will be hereinafter referred to and more particularly pointed out in the claim.

Figure 1:
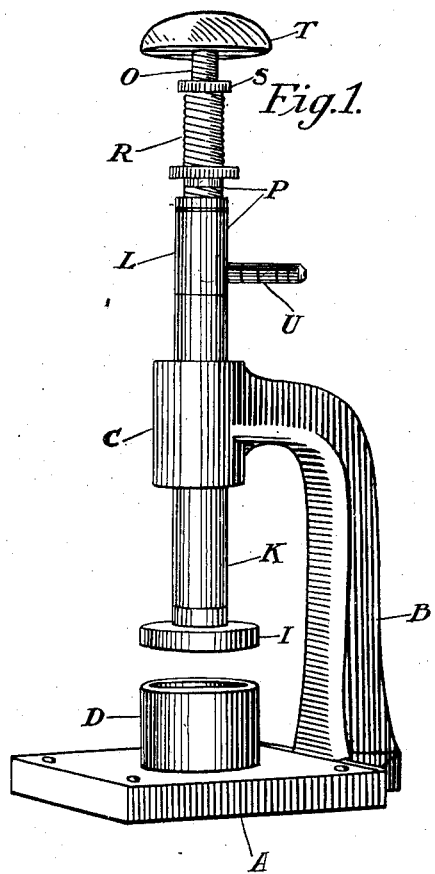
Figure 2:
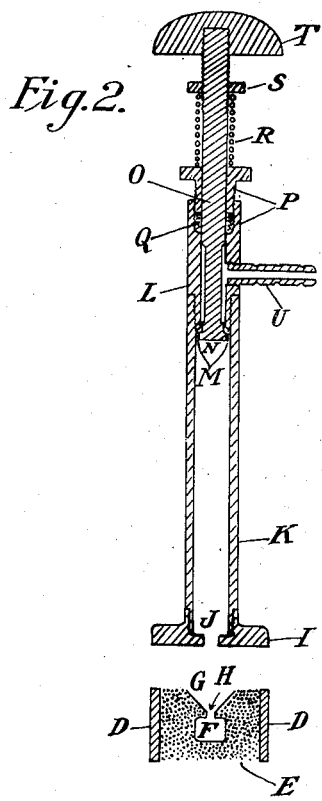

In the accompanying drawings which are made a part of this application, Figure 1 is a perspective view of a mold and parts to convey the air or steam thereto, and, Fig. 2 is a central, vertical, sectional view through the mold and air-conveying parts.

Referring to the drawings in which similar reference characters designate corresponding parts throughout the several views, A indicates a base, to which is secured a standard B, the upper end of the standard being curved inwardly to extend over the base A and is provided with a tubular socket C. Resting upon the base A and vertically below the socket C, is a flask D, which flask is adapted to be filled with any suitable form of investment material E, which is capable of withstanding heat and, at the same time, retain its shape and, in order to form a mold F in the material E, a pattern with a projection thereon to form a gate, is suspended in the flask D and the material E placed around the same, said pattern being constructed of material that can be readily disintegrated by washing or destroyed by burning the same and, when the pattern is so removed, the mold cavity is formed.

A conical depression G is formed around the gate H, leading into the mold F, into which the metal to be cast is placed and is melted by applying a blow pipe or torch thereto, and, when the pattern is composed of a substance destructible by fire, the application of a torch or blow pipe will have destroyed the pattern by the time the metal has reached a molten state.

As soon as the metal has reached a molten state, I provide my improved means for directing air or steam pressure onto the molten material to force the same into the mold and cause it to reach all parts of the mold, which consists of a plate I, which is of sufficient diameter to snugly rest upon the upper end of the flask D, said plate being provided with a bore J, through which the air or steam may pass into engagement with molten metal. The air or steam is conveyed to the bore J through a tube K, the lower end of which tube is secured in any preferred manner to the plate I, while the upper end of the tube has secured thereto a valve casing L, the lower end of the valve casing being provided with a seat M, with which is adapted to coöperate a valve N, said valve being controlled through the medium of a stem O, which extends upwardly through the valve casing L.

The upper end of the valve casing L is provided with a stuffing box P, which stuffing box is filled with the usual form of packing Q, so that the air or steam will be prevented from passing between the stem O and upper end of the valve casing L.

The valve N is normally held in engagement with the seat M by introducing a spring R around the upper end of the stem O and between the stuffing box P and an adjusting nut S, said nut being interiorly threaded to coöperate with threads on the stem O and by which means the tension of the spring may be increased or decreased.

The upper end of the stem O is provided with a knob T, whereby pressure may be readily directed on said stem when it is desired to depress the valve N and disengage the same from its seat. The air or steam is supplied from any suitable form of pressure tank and is conveyed to the valve casing through a tubular extension U, said extension intersecting the casing at a point between the valve N and the stuffing box P.

In operation, the metal is placed in the depression G and melted in the usual or any preferred manner, the tube K and parts attached thereto, having been previously moved upwardly through the socket C and out of the way. As soon, however, as the metal is melted, the plate I is lowered into engagement with the upper edge of the flask D by directing pressure on the knob T, the tension of the spring R being such as to hold the valve in engagement with its seat, while this operation is being performed.

When the plate I has been properly seated upon the flask D, a continuous pressure is directed on the knob T and the tension of the spring R overcome, thereby removing the valve N from its seat and permitting the air or steam to pass through the tube K and directly onto the molten metal, the tension required to overcome the tension of the spring, being sufficient to tightly clamp the plate I into engagement with the flask D and prevent the escape of the air or steam between the plate and flask. By thus directing pressure on the molten substance in the mold, the metal will be forced into all parts of the mold and a perfect casting produced. The importance of forcing the metal into all parts of the mold will be more readily apparent when it is stated that this device is adapted more particularly to be used by dentists for casting inlays or fillings for teeth, artificial crowns, dental bridges, regulating and retaining appliances, etc., although it will be understood that the same may be used for casting various articles where an accurate casting is desired, such as jewelry, or the like and, instead of melting the metal in the depression G, said metal may be poured from a ladle or similar appliance, while in a molten state and, instead of forming the mold in the manner shown, a divisional flask may be provided and the mold constructed around a pattern in the ordinary way. It will further be seen that this form of mold may be used in casting articles so small that the molten substance would not enter the mold without forcing the same thereinto with the air or steam pressure and, by providing the adjusting nut S and arranging the same as shown, the tension of the spring R may be readily increased or decreased, thereby increasing or decreasing the amount of pressure required to move the valve away from its seat, the greater the tension of the spring the greater the pressure of the plate I upon the flask when the valve is removed from its seat. It will thus be seen that when the pressure of the air or steam is to be increased, the adjusting nut S is operated to increase the tension of the spring R and, by proper adjustment of the nut, the required amount of pressure on the plate I to prevent the escape of the air or steam between the flask and plate, will be accomplished.

It will thus be seen that I have provided a very cheap and economical form of means for directing pressure upon molten metal to force the same into all parts of the mold and produce a perfect casting and, by arranging the parts as shown, it will be seen that such parts as are necessary to be handled, will be a sufficient distance from the molten substance as not to become heated.

What I claim is:

In a molding appliance, the combination with a flask having a mold therein and means to support said flask; of a plate adapted to be seated on said flask, said plate having a bore registering with the mold, an air or steam conveying tube secured to the plate, a valve casing at the upper end of the tube, a seat at the lower end of the valve casing, a valve adapted to coöperate with said seat, a stem extending upwardly from the valve, a stuffing box for the upper end of the casing, a spring surrounding the stem and resting upon the stuffing box, an adjusting nut threaded onto the upper end of said stem adapted to regulate the tension of the spring, means to convey air or steam into the valve casing above the valve, a socket to movably receive the tube and a knob at the upper end of the stem to receive pressure, whereby the plate may be lowered into engagement with the flask and the valve moved from its seat.

In testimony whereof I have signed my name to this specification in the presence of two subscribing witnesses.

ALFRED T. RASMUSSEN.

Witnesses:
 JOHN W. HEDDEWEB,
 GEORGE F. HAUSER.